US010065537B2

(12) United States Patent
Noguchi et al.

(10) Patent No.: US 10,065,537 B2
(45) Date of Patent: Sep. 4, 2018

(54) SEAT RECLINING DEVICE

(71) Applicant: Aisin Seiki Kabushiki Kaisha, Kariya-shi (JP)

(72) Inventors: Masao Noguchi, Kariya (JP); Hideo Nihommatsu, Anjo (JP); Yasuhiro Kojima, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 24 days.

(21) Appl. No.: 15/248,403

(22) Filed: Aug. 26, 2016

(65) Prior Publication Data

US 2017/0088021 A1 Mar. 30, 2017

(30) Foreign Application Priority Data

Sep. 30, 2015 (JP) ................................. 2015-195364

(51) Int. Cl.
*B60N 2/22* (2006.01)
*B60N 2/20* (2006.01)
*B60N 2/235* (2006.01)

(52) U.S. Cl.
CPC ............. *B60N 2/2227* (2013.01); *B60N 2/20* (2013.01); *B60N 2/2362* (2015.04)

(58) Field of Classification Search
CPC ........ B60N 2/22; B60N 2/235; B60N 2/2227; B60N 2/2362; B60N 2/20
See application file for complete search history.

(56) References Cited

U.S. PATENT DOCUMENTS

| 6,848,745 | B1* | 2/2005 | Tsuge | B60N 2/2362 |
| | | | | 297/367 R |
| 7,562,926 | B2* | 7/2009 | Kojima | B60N 2/123 |
| | | | | 296/65.09 |
| 8,205,944 | B2* | 6/2012 | Watanabe | B60N 2/20 |
| | | | | 297/341 |
| 9,039,086 | B2* | 5/2015 | Morimoto | B60N 2/682 |
| | | | | 297/342 |
| 2013/0147249 | A1* | 6/2013 | Champ | B60N 2/3011 |
| | | | | 297/337 |
| 2014/0015297 | A1* | 1/2014 | Cooley | B60N 2/20 |
| | | | | 297/378.1 |

FOREIGN PATENT DOCUMENTS

JP 2007-307182 11/2007

* cited by examiner

*Primary Examiner* — Philip F Gabler
(74) *Attorney, Agent, or Firm* — Oblon, McClelland, Maier & Neustadt, L.L.P.

(57) ABSTRACT

A seat reclining device includes: a reclining unit that includes a fixing member fixed to a seat cushion side and a rotating member fixed to the seat cushion side and supported by the fixing member to rotate freely, and that switches freely between a locked state and an unlocked state; a transmission lever supported by the fixing member to rotate freely on the same center as the fixing member; a release operation lever supported on the seat cushion side to rotate freely between lock operation and unlocking operation positions; a link which includes a protruding portion, in which each end portion of the link is supported by one of the transmission and release operation levers to rotate freely, and which switches the reclining unit from the locked state to the unlocked state; and a holding plate that includes an unlock holding portion.

7 Claims, 6 Drawing Sheets

RELEASE STROKE
ADJUSTMENT RANGE

SEAT RECLINING DEVICE

CROSS REFERENCE TO RELATED APPLICATIONS

This application is based on and claims priority under 35 U.S.C. § 119 to Japanese Patent Application 2015-195364, filed on Sep. 30, 2015, the entire contents of which are incorporated herein by reference.

TECHNICAL FIELD

This disclosure relates to a seat reclining device.

BACKGROUND DISCUSSION

In the related art, there is known a seat reclining device which is described in JP-A-2007-307182 (Reference 1), for example. The seat reclining device is provided with a reclining unit which is interposed between a cushion frame (a cushion-side arm) and a back frame (a back-side arm). When the seat back occupies a reclining locking range between a standing state and a maximum reclined state, it is possible to lock or unlock the reclining unit at an arbitrary angle, and when the seat back occupies a non-locking range between the standing state and a pushed-forward state, the reclining unit rotates freely. The seat reclining device is provided with an unlocking lever for switching the reclining unit from the locked state to an unlocked state. The seat reclining device is provided with a restraint lever which is connected to the unlocking lever via a long hole and a pin to restrain the rotation of the unlocking lever in the locking direction such that the seat reclining device rotates in an opposite direction from the rotational direction of the unlocking lever when the unlocking lever is caused to rotate in an unlocking direction. The seat reclining device is provided with a pressing portion which is provided on the back frame and presses the restraint lever.

In this configuration, when the seat back is pushed forward in a state in which the restraint lever occupies an unlocked position in accordance with an unlocking operation of the unlocking lever, the unlocking lever is held in the unlocked position with the restraint lever due to the pressing portion pressing the restraint lever, and the unlocking of the reclining unit is maintained continually.

Incidentally, in Reference 1, the unlocking lever is held in the unlocked position due to the pressing portion holding (pressing) the restraint lever in the pushed-forward state of the seat back. In this case, when an attempt is made to stand the seat back from the pushed-forward state, the unlocking lever is apt to rotate toward a locked position together with the restraint lever which is freed from the pressing portion. At this time, the unlocking lever is held in the unlocked position due to the pushed-forward state of the seat back occupying the non-locking range of the reclining unit. In other words, it is necessary to adopt a reclining unit in which the pushed-forward state of the seat back occupies the non-locking range, and the design freedom is impaired.

SUMMARY

Thus, a need exists for a seat reclining device which is not suspectable to the drawback mentioned above.

A seat reclining device according to an aspect of this disclosure includes a reclining unit that includes a fixing member which is fixed to a seat cushion side and a rotating member which is fixed to the seat cushion side and is supported by the fixing member to rotate freely, and that switches freely between a locked state which restricts rotation of the rotating member in relation to the fixing member and an unlocked state which allows the rotation, a transmission lever which is supported by the fixing member to rotate freely on the same center as the fixing member, a release operation lever which is supported on the seat cushion side to rotate freely between a lock operation position and an unlocking operation position, a link which includes a protruding portion, in which each end portion of the link is supported by one of the transmission lever and the release operation lever to rotate freely, and which switches the reclining unit from the locked state to the unlocked state via the transmission lever in accordance with rotation of the release operation lever from the lock operation position to the unlocking operation position, and a holding plate that includes an unlock holding portion which is joined to the seat back side to rotate integrally, which extends in a circumferential direction centered on an axial line of the rotating member, and which pushes up the protruding portion when the release operation lever is in the unlocking operation position due to a rotational position of the seat back in relation to the seat cushion reaching the unlock holding region.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, description will be given of an embodiment of a seat reclining device. Hereinafter, the front-rear direction of the seat will be referred to as the "front-rear direction". The inside and the outside in the width direction of the seat will be referred to as the "inside" and the "outside", respectively.

Figure 1:
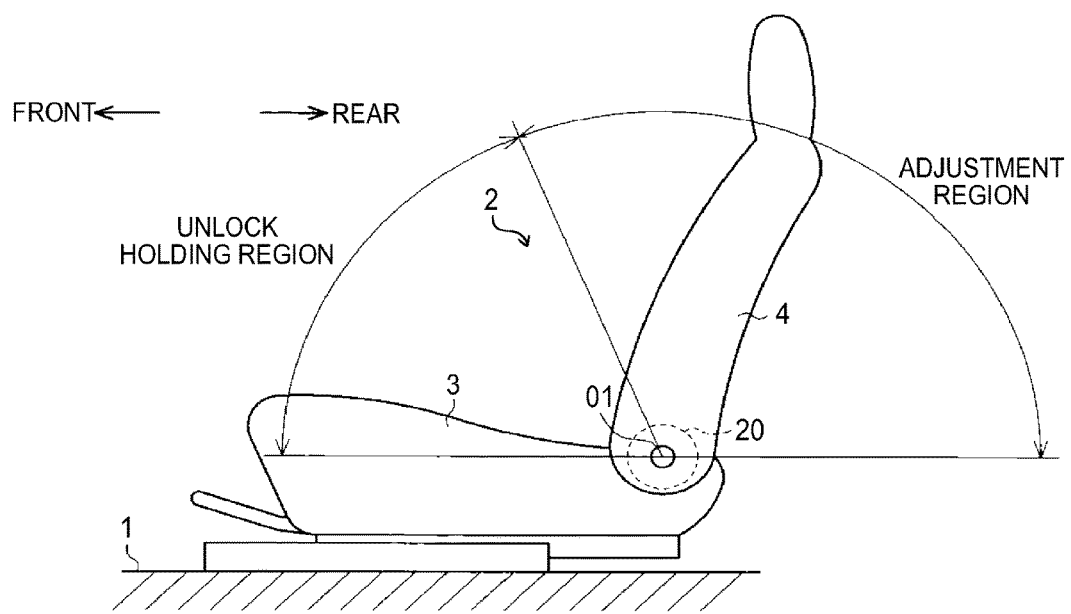
FIG. 1 is a side surface view of a seat reclining device to which an embodiment of the seat reclining device is applied.

As illustrated in FIG. 1, a seat 2 which forms a passenger seating unit is installed on a vehicle floor 1. The seat 2 is configured to include a seat cushion 3 which forms a seating surface, and a seat back 4 which is supported on a rear end portion of the seat cushion 3 via a substantially disc-shaped reclining unit 20 to incline (rotate) freely around a center line O1. The inclination angle of the seat back 4 in relation to the seat cushion 3 is mechanically restrained to a range from a pushed-forward position at which the seat back 4 extends forward to be substantially parallel to a greatly-pushed position at which the seat back 4 extends backward to be substantially parallel. The range of the inclination angle of the seat back 4 in relation to the seat cushion 3 is divided into an unlock holding region which includes the pushed-forward position and is close to the front, and an adjustment region which includes the greatly-pushed position and is close to the rear.

In the present embodiment, the range from the pushed-forward position to the greatly-pushed position is set to approximately 180°, and the adjustment region is set to fall just below 120°. In the unlock holding region, the reclining unit 20 is held in a state in which the rotation of the seat back 4 in relation to the seat cushion 3 is possible. In the adjustment region, it is possible to adjust and hold the inclination angle of the seat back 4 in multiple stages by the reclining unit 20 in delimitations of a predetermined angle.

Figure 2:
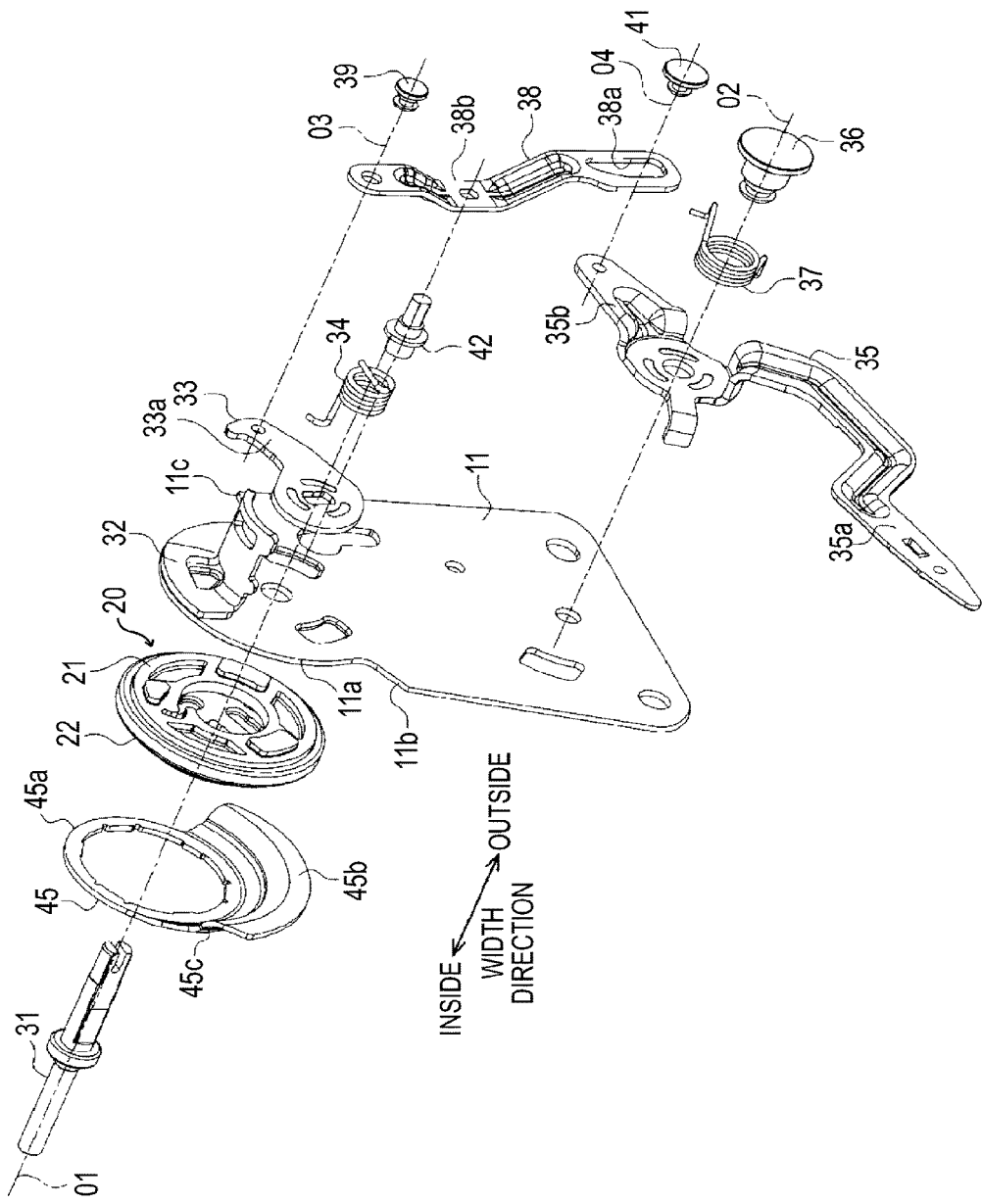
FIG. 2 is an exploded perspective diagram illustrating the structure of the seat reclining device of the embodiment.
Figure 3B:
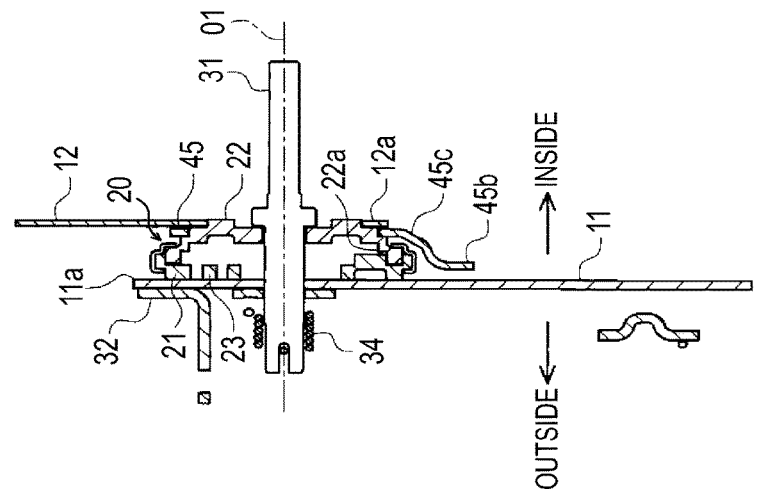
FIG. 3B is a sectional diagram illustrating the structure of the seat reclining device of the embodiment.

As illustrated in FIGS. 2 to 3B, the reclining unit 20 is interposed between a cushion side frame 11 and a back side frame 12. The cushion side frame 11 forms the framework of a side rear portion of the seat cushion 3, and the back side frame 12 forms the framework of a side bottom portion of the seat back 4. The back side frame 12 is disposed on the inside of the cushion side frame 11.

The cushion side frame 11 is formed of a metal plate, for example, and includes a connecting portion 11a, a front restriction part 11b, and a rear restriction part 11c. The connecting portion 11a protrudes upward and is a substantially arc-shaped plate, and the front restriction part 11b and rear restriction part 11c protrude to the front and the rear in a radial direction centered on a center (the center line O1) of the connecting portion 11a. Meanwhile, the back side frame 12 is formed of a metal plate, for example, and includes a connecting portion 12a and a restriction part 12b. The connecting portion 12a protrudes toward the cushion side frame 11 and is a substantially arc-shaped plate, and the restriction part 12b extends in a circumferential direction above the connecting portion 12a centered on a center (the center line O1) of the connecting portion 12a.

The reclining unit 20 is provided with a substantially disc-shaped first disc 21 as a fixing member which is fixed to the cushion side frame 11 with substantially the same center as the connecting portion 11a, and a substantially disc-shaped second disc 22 which is a rotating member which is fixed to the back side frame 12 with substantially the same center as the connecting portion 12a. The second disc 22 is stopped in the axial line direction in a state of being axially supported by the first disc 21. Accordingly, the back side frame 12 is supported to rotate freely by the cushion side frame 11 via the reclining unit 20. At this time, the restriction part 12b is positioned closer to the outer circumferential side than the connecting portion 11a and the reclining unit 20, and the front restriction part 11b and the rear restriction part 11c are positioned on the rotational path around the center line O1. In other words, the position at which the restriction part 12b makes contact with the front restriction part 11b in accordance with the forward pushing of the seat back 4 matches the pushed-forward position, and the position at which the restriction part 12b makes contact with the rear restriction part 11c in accordance with the backward pushing of the seat back 4 matches the greatly-pushed position.

A substantially columnar operating shaft 31, which is stepped and the axial line of which extends along the center line O1, penetrates the cushion side frame 11, the back side frame 12, and the reclining unit 20. The operating shaft 31 is joined to a cam (not illustrated), which is stored in the first disc 21, to rotate integrally with the cam. The cam is connected to a pole (not illustrated) which is stored in the first disc 21 to be capable of moving freely in the radial direction centered on the center line O1, for example, and causes the pole to progress and withdraw in accordance with rotation. By meshing with an internal gear 22a which is formed on the second disc 22 in accordance with progression in the radial direction of the pole centered on the center line O1, the reclining unit 20 restricts the relative rotation between the first and second discs 21 and 22, that is, the rotation of the back side frame 12 in relation to the cushion side frame 11 (the locked state). Meanwhile, due to the meshing with the internal gear 22a in accordance with withdrawal in the radial direction of the pole centered on the center line O1, the reclining unit 20 allows the relative rotation between the first and second discs 21 and 22, that is, the rotation of the back side frame 12 in relation to the cushion side frame 11 (the unlocked state). The reclining unit 20 is provided with a return spring 23 which is fitted between the first disc 21 and the cam, and is ordinarily held in the locked state by the biasing force of the return spring 23.

A bracket 32 is bonded to the outside surface of the top end portion of the cushion side frame 11, and is formed of a metal plate, for example. The tip portion of the outside which penetrates the cushion side frame 11 of the operating shaft 31 in to rotate freely is fitted into a transmission lever 33 formed of a metal plate such that the tip portion rotates integrally with the transmission lever 33, for example. The transmission lever 33 includes a lever protrusion part 33a which extends in the radial direction near the rear and is centered on the center line O1. A return spring 34 formed of a torsion coil spring, for example, is wound around the tip portion of the outside which further penetrates the transmission lever 33 of the operating shaft 31. Each of the ends of the return spring 34 is locked to one of the operating shaft 31 and the bracket 32, and the operating shaft 31, the transmission lever 33, and the like are held in a rotational position corresponding to the locked state by the biasing force of the return spring 34. In other words, in the locked state, the return spring 34 biases the cam such that no play is generated between the operating shaft 31 and the cam. It goes without saying that, when the transmission lever 33 rotates, the operating shaft 31 and the cam interlock with the transmission lever 33 to rotate. In the present embodiment, the reclining unit 20 switches from the locked state described above to the unlocked state due to the transmission lever 33 (and the cam) rotating from the rotational position illustrated in FIG. 3A in the clockwise direction of the drawings.

On a bottom end portion of the cushion side frame 11 which is below the transmission lever 33, a release operation lever 35 formed of a metal plate, for example, is supported by a support pin 36 to rotate freely around an axial line O2 which is parallel to the center line O1. A return spring 37 formed of a torsion coil spring, for example, is wound around the support pin 36. Each of the ends of the return spring 37 is locked to one of the cushion side frame 11 and the release operation lever 35, and the release operation lever 35 is held at a predetermined rotational position (hereinafter also referred to as a "lock operation position") by the biasing force of the return spring 37. The release operation lever 35 includes a substantially bow-shaped handle portion 35a and a lever protrusion part 35b. The handle portion 35a extends toward the front in the radial direction centered on the axial line O2 at the lock operation position, and the lever protrusion part 35b extends toward the rear.

Each of the end portions of a substantially arm-shaped link 38 formed of a metal plate, for example, is supported to rotate freely by one of the lever protrusion part 33a of the transmission lever 33 and the lever protrusion part 35b of the release operation lever 35. In other words, the top end portions of the lever protrusion part 33a and the link 38 rotate freely around an axial line O3 which is parallel to the center line O1 due to a support pin 39 which penetrates the top end portions. Meanwhile, a substantially trapezoidal (a variant shaped hole shape) engaging hole 38a which is an engaging recessed portion is formed in the bottom end portion of the link 38. The bottom end portions of the lever protrusion part 35b and the link 38 rotate freely around an axial line O4 which is parallel to the center line O1 due to a support pin 41 which is an engaging protruding portion which is loosely inserted into the engaging hole 38a to be fastened to the lever protrusion part 35b.

A substantially C-shaped folded portion 38b is formed in the middle portion in the up-down direction of the link 38. The folded portion 38b is relatively displaced to the inside (the side approaching the cushion side frame 11), and the link 38 approaches or abuts against the cushion side frame 11 at the engaging hole 38a. A substantially circular columnar pin 42 which is a protruding portion is provided on the folded portion 38b to protrude toward the inside. The pin 42 penetrates the cushion side frame 11 at the bottom of the transmission lever 33, and the tip of the pin 42 reaches the outer circumferential side of the reclining unit 20.

When the release operation lever 35 is in a lock operation position and the transmission lever 33 is in the rotational position corresponding to the locked state, the support pin 41 is positioned at the relatively expanded bottom end of the engaging hole 38a. Therefore, when the release operation lever 35 is operated to rotate in the clockwise direction of the drawings, the link 38 in which the engaging hole 38a is pressed downward by the support pin 41 moves downward. At this time, the transmission lever 33 rotates in the clockwise direction of the drawings, that is, in the direction in which the reclining unit 20 switches to the unlocked state due to the lever protrusion part 33a being pulled downward. The rotational position of the release operation lever 35 when the switching of the reclining unit 20 to the unlocked state is completed is also referred to as the "unlocking operation position".

A substantially ring-shaped holding plate 45 formed of a metal plate, for example, is fixed to the second disc 22. The holding plate 45 includes a substantially toric fixing portion 45a with the same center as the second disc 22, and is fitted to the second disc 22 at the fixing portion 45a. The holding plate 45 includes a substantially fan-shaped unlock holding portion 45b which extends in the radial direction from the fixing portion 45a across a predetermined angular range centered on the center line O1. The tip of the unlock holding portion 45b extends in the circumferential direction centered on the center line O1.

The holding plate 45 is fixed to the second disc 22 closer to the outside (the cushion side frame 11 side) than the back side frame 12, and thus, the separation distance between the holding plate 45 and the cushion side frame 11 is reduced. In particular, a taper 45c which is relatively displaced to the outside (the side approaching the cushion side frame 11) is formed at the boundary portion between the unlock holding portion 45b and the fixing portion 45a, and thus, the unlock holding portion 45b is rendered close to the cushion side frame 11.

Figure 4:
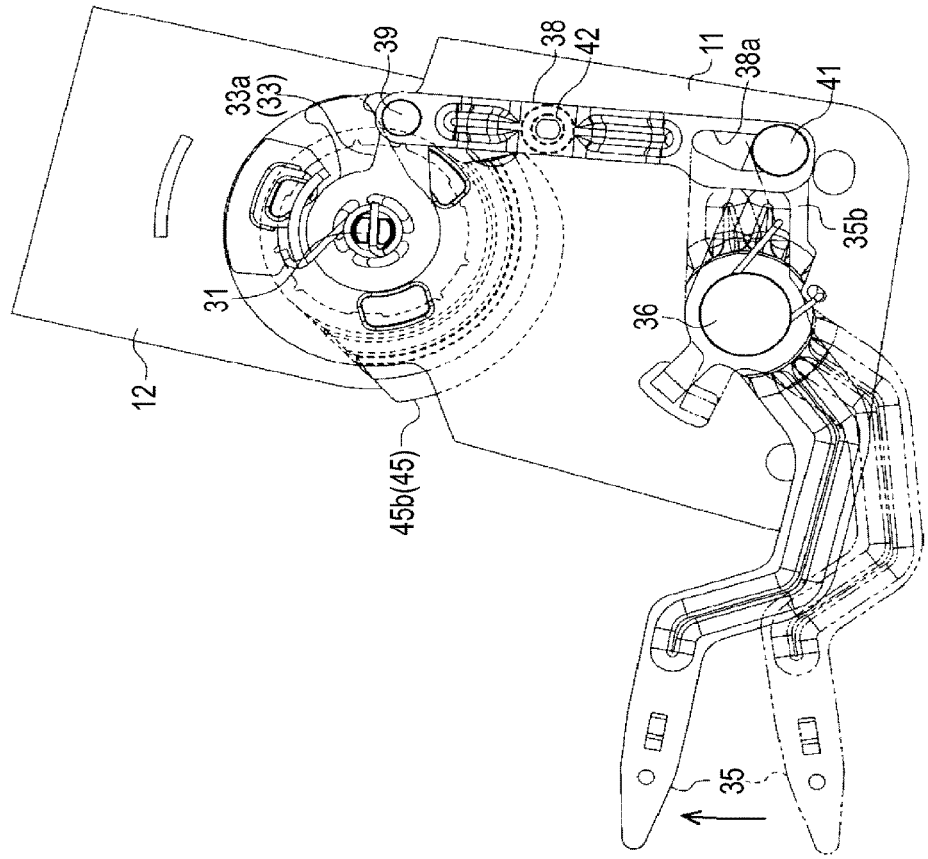
FIG. 4 is a side surface view illustrating the operation of the seat reclining device of the embodiment.

As illustrated in FIG. 4, the pin 42 of the link 38 when the reclining unit 20 is in the unlocked state is disposed adjacent to the rotational path of the unlock holding portion 45b on the outer circumferential side of the rotational path centered on the center line O1. Therefore, when the unlock holding portion 45b of the holding plate 45 which rotates integrally with the second disc 22 reaches the pin 42 in accordance with the rotation (equivalent to the pushing forward of the seat back 4) in the clockwise direction of the drawings of the back side frame 12 in relation to the cushion side frame 11, the pin 42 is pushed up onto the unlock holding portion 45b, and movement thereover, that is, rotation in the counterclockwise direction of the drawings of the transmission lever 33 in which the reclining unit 20 switches to the locked state is restricted. Accordingly, it goes without saying that the reclining unit 20 is held in the unlocked state. In other words, the unlock holding region corresponds to the pushing forward range of the seat back 4 in which the unlock holding portion 45b reaches the pin 42.

Next, description will be given of the operations of the embodiment.

Figure 3A:
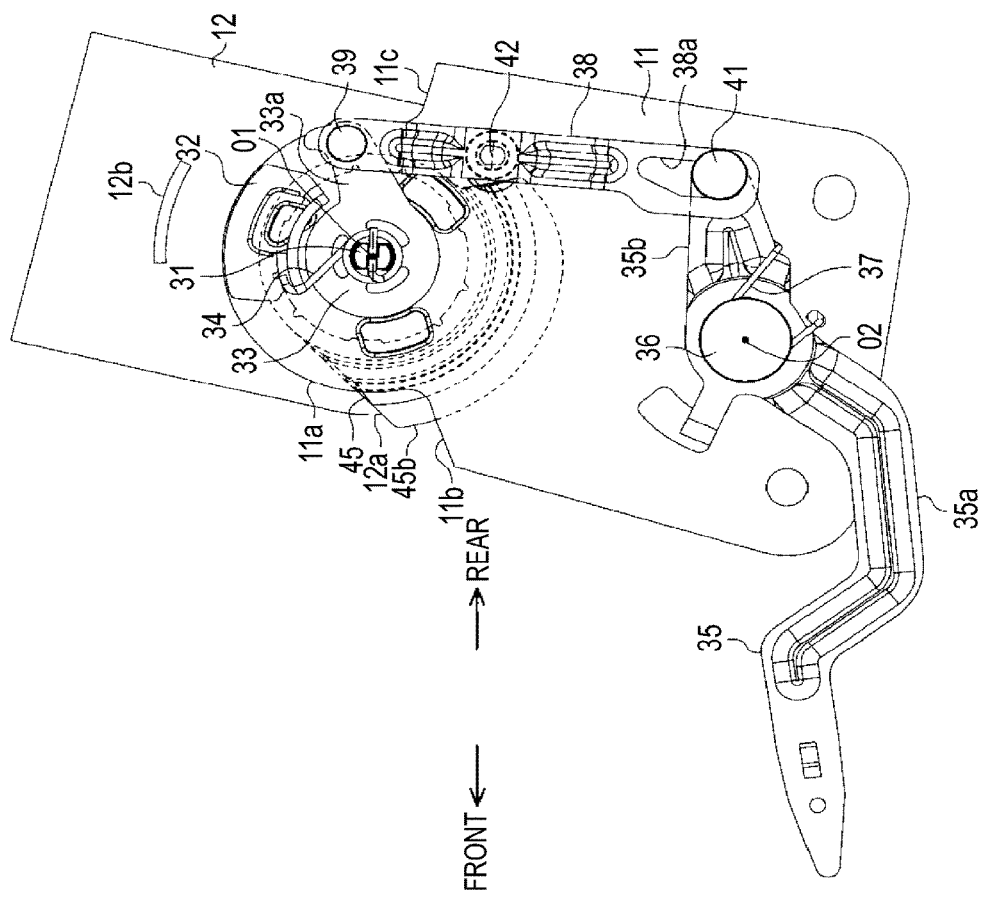
FIG. 3A is a side surface view illustrating the structure of the seat reclining device of the embodiment.

First, as illustrated in FIG. 3A, the release operation lever 35 is in the lock operation position, and the reclining unit 20 is in the locked state. In this state, the release operation lever 35 is operated to rotate in the clockwise direction of the drawings to the unlocking operation position. At this time, as illustrated in the change from FIG. 3A to FIG. 4, the link 38, the engaging hole 38a of which is pressed by the support pin 41 which moves downward together with the lever protrusion part 35b, moves downward, and the transmission lever 33, which is pulled downward by the lever protrusion part 33a thereof, rotates clockwise in the drawings. Accordingly, the reclining unit 20 is switched to the unlocked state. If the release operation lever 35 is released in this state, the reclining unit 20 switches (returns) to the locked state as described earlier. In other words, if the inclination angle of the seat back 4 is in the adjustment region, it is possible to perform adjustment and holding of the inclination angle using the previously-described operations.

Figure 5:
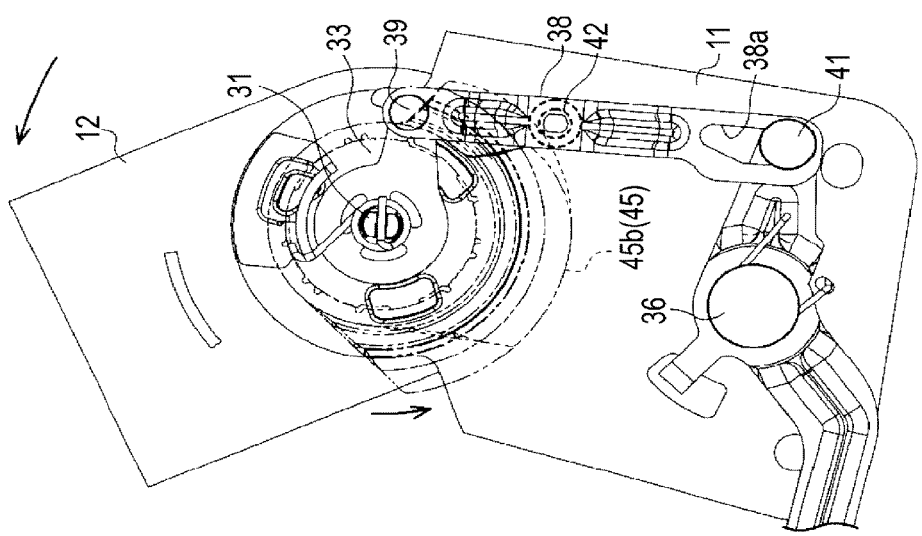
FIG. 5 is a side surface view illustrating the operation of the seat reclining device of the embodiment.

As illustrated in the change from FIG. 4 to FIG. 5, when the unlock holding portion 45b of the holding plate 45 reaches the pin 42 in accordance with the rotation in the clockwise direction of the drawings of the back side frame 12 (equivalent to the pushing forward of the seat back 4), the pin 42 is pushed up onto the unlock holding portion 45b, and movement thereover, that is, rotation in the counterclockwise direction of the drawings of the transmission lever 33 in which the reclining unit 20 switches to the locked state is restricted. Therefore, as illustrated in the change from FIG. 5 to FIG. 6, the reclining unit 20 holds the unlocked state until the rotational position corresponding to the pushed-forward position of the seat back 4. This state is maintained until the unlock holding portion 45b of the holding plate 45 passes the pin 42 in accordance with the rotation in the clockwise direction of the drawings of the back side frame 12 (equivalent to the backward pushing of the seat back 4).

Figure 6:
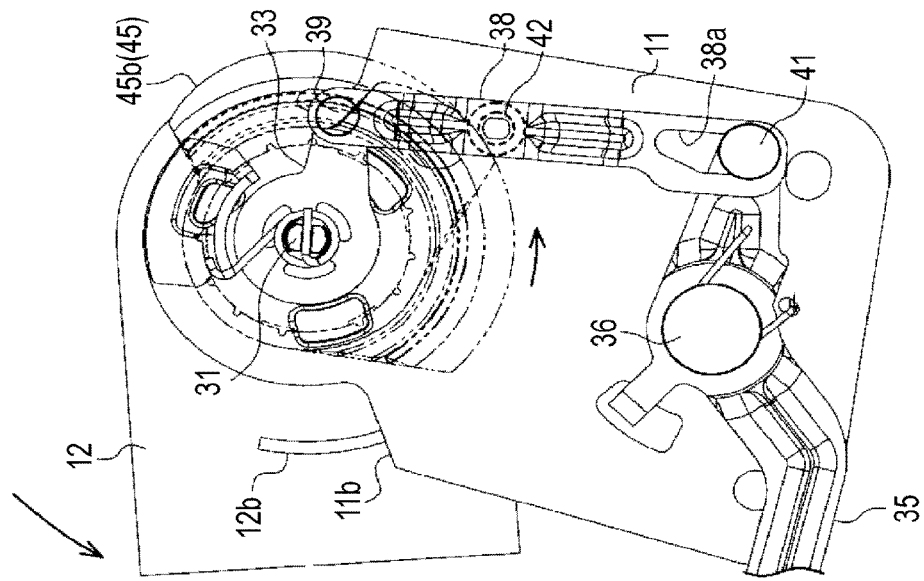
FIG. 6 is a side surface view illustrating the operation of the seat reclining device of the embodiment.
Figure 7:
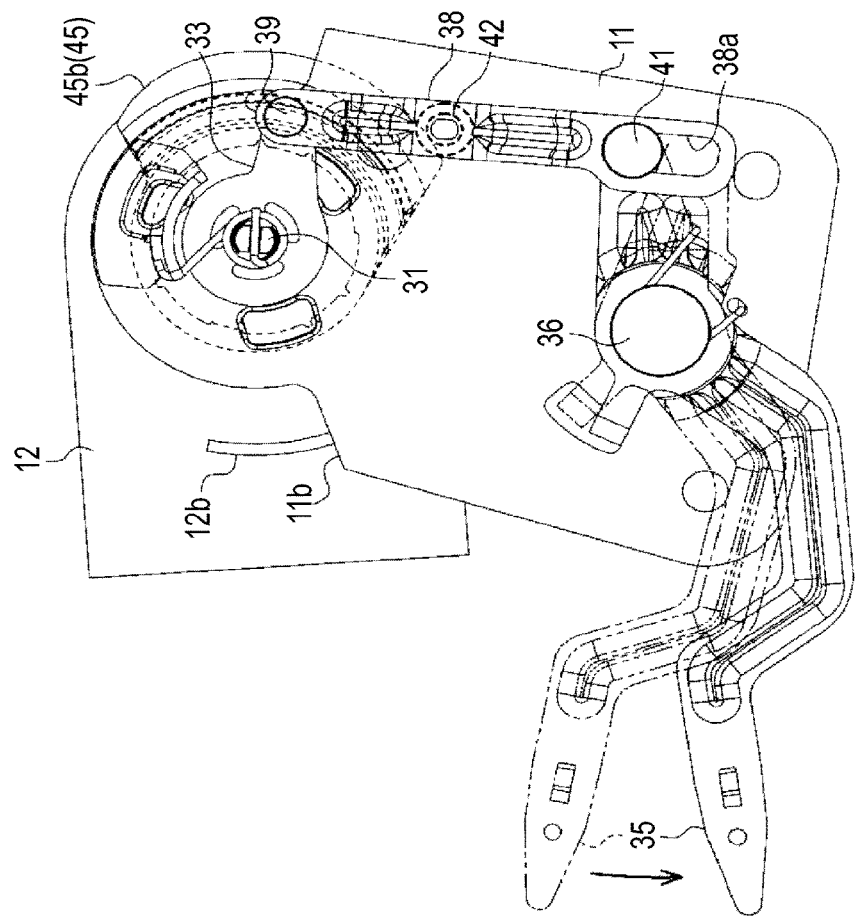
FIG. 7 is a side surface view illustrating the operation of the seat reclining device of the embodiment.

As illustrated in the change from FIG. 6 to FIG. 7, by causing the release operation lever 35 to rotate in the clockwise direction of the drawings while causing the support pin 41 to move in the range of the play between the support pin 41 and the engaging hole 38a, the release operation lever 35 rotates (returns) to the lock operation position.

According to the embodiment, as described in detail above, it is possible to obtain the following effects.

(1) In the present embodiment, when the reclining unit 20 is in the locked state, the release operation lever 35 is caused to rotate from the lock operation position to the unlocking operation position, and thus, the reclining unit 20 switches to the unlocked state via the link 38 and the transmission lever 33. Accordingly, the rotational position of the seat back 4 in relation to the seat cushion 3, that is, the inclination angle of the seat back 4 becomes adjustable. At this time, when the rotational position of the seat back 4 in relation to the seat cushion 3 reaches the unlock holding region, the link 38 maintains the orientation in relation to the seat cushion 3 together with the transmission lever 33 regardless of the rotation of the seat back 4 due to the pin 42 being pushed up onto the unlock holding portion 45b. In other words, even if the seat back 4 is caused to stand from the pushed-forward state, as long as the rotational position of the seat back 4 in relation to the seat cushion 3 is in the unlock holding region, the reclining unit 20 maintains the unlocked state. In this manner, it is possible to maintain the unlocked state of the reclining unit 20 through the setting of the unlock holding region by the holding plate 45 without relying on the specifications of the reclining unit 20, and it becomes possible to improve the design freedom.

For example, even if the reclining unit 20 includes three poles which are arranged at an equal angular interval and the adjustment region is restricted to a maximum of 120°, it is possible to sufficiently secure the unlock holding region which is connected from the adjustment region without relying on this configuration. Alternatively, even if the reclining unit 20 is simple and does not include an unlock holding structure (a well-known ring-shaped guide for unlock holding which is formed on the second disc 22 or the like), it is possible to set the unlock holding region using the holding plate 45 or the like. In other words, due to the unlock holding region being possible to set without relying on the specification of the reclining unit 20 in general, it becomes possible to use more common parts for the reclining unit 20, and it is possible to reduce costs.

(2) In the present embodiment, the holding plate 45 is directly fixed to the second disc 22. Therefore, due to the holding plate 45 being compactly disposed on the second disc 22 (the reclining unit 20), it is possible to achieve a more compact overall device.

(3) In the present embodiment, the end portions of the release operation lever 35 and the link 38 are supported to rotate freely by the support pin 41 which is provided to protrude from the release operation lever 35 and the engaging hole 38a which is formed in the link 38. The engaging hole 38a is pressed by the support pin 41 via the link 38 and the transmission lever 33 in accordance with the rotation of the release operation lever 35 to the unlocking operation position such that the reclining unit 20 switches to the unlocked state. Alternatively, the engaging hole 38a allows the movement of the support pin 41 so as to allow the rotation of the release operation lever 35 to the lock operation position when the reclining unit 20 is in the unlocked state together with the link 38 and the transmission lever 33. Accordingly, for example, even if the rotational position of the seat back 4 in relation to the seat cushion 3 is in the unlock holding region, the release operation lever 35 is capable of rotating to the lock operation position while causing the support pin 41 to move within the engaging hole 38a. Therefore, for example, even if the release operation lever 35 is influenced by an external force to rotate from the unlocking operation position to the lock operation position, the reclining unit 20 is suppressed from following the rotation to switch to the locked state.

(4) In the present embodiment, the holding plate 45 is fixed to the second disc 22 on the side closer to the first disc 21 than the back side frame 12 in the width direction of the seat. Therefore, due to the holding plate 45 being disposed on the side closer to the first disc 21 than the back side frame 12, it is possible to achieve a more compact overall device. Since it is possible to fix the holding plate 45 to the second disc 22 in a singular state of the reclining unit 20 before the fixing of the back side frame 12 and the like, it is possible to further reduce the number of management work hours. Alternatively, since it is possible to fix the second disc 22 to the back side frame 12 regardless of whether or not the holding plate 45 is present, it is possible to more easily perform a change in the specification corresponding to the presence or absence setting of the unlock holding region.

(5) In the present embodiment, the taper 45c which relatively displaces the unlock holding portion 45b to the side approaching the cushion side frame 11 (the outside) in the width direction of the seat is formed on the holding plate 45. Therefore, it is possible to suppress the protrusion length of the pin 42 which is necessary for the pushing up of the pin 42 onto the unlock holding portion 45b.

(6) In the present embodiment, the link 38 includes the folded portion 38b which relatively displaces the pin 42 to the side approaching the cushion side frame 11 (the inside) in the width direction of the seat. Therefore, it is possible to suppress the protrusion length of the pin 42 which is necessary for the pushing up of the pin 42 onto the unlock holding portion 45b.

(7) In the present embodiment, it is possible to easily change the boundary position between the adjustment region and the unlock holding region by changing the attachment position of the holding plate 45. Alternatively, it is possible to easily change the unlock holding region by changing the extending range of the unlock holding portion 45b to match the change to the pushed-forward position which is defined by the front restriction part 11b and the restriction part 12b.

(8) In the present embodiment, generally, it is possible to add an unlock holding function with small changes to the structure using a one plate part (the holding plate 45) and one pin (the pin 42).

The embodiment described above may also be modified as described below.

Figure 8:
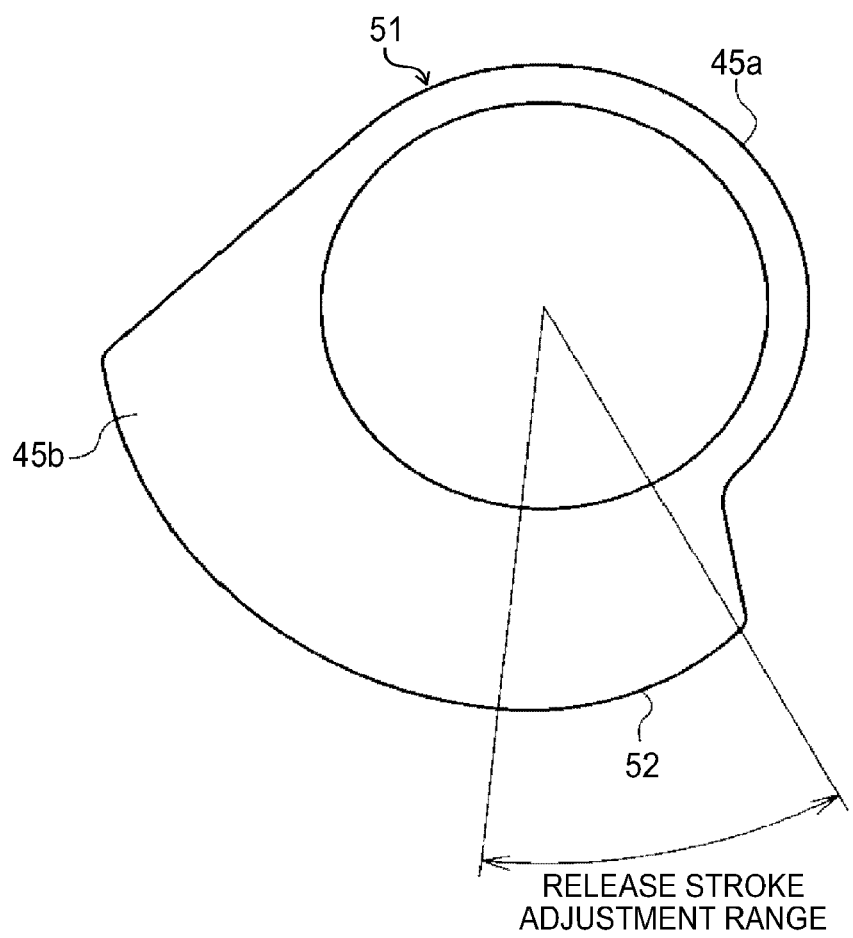
FIG. 8 is a side surface view illustrating the structure of a seat reclining device of a modification example.

As illustrated in FIG. 8, a holding plate 51 which includes a release stroke adjustment range 52 in the unlock holding portion 45b may be adopted. The release stroke adjustment range 52 is formed such that the separation distance from the center line O1 gradually increases from the end of one side in the circumferential direction (the counterclockwise side in the drawings) centered on the center line O1 of the unlock holding portion 45b, that is, from the starting point of the pushing up of the pin 42 toward the other side in the circumferential direction. Therefore, the pin 42 which is pushed up onto the release stroke adjustment range 52 gradually moves downward together with the link 38 as the pin 42 progresses into the release stroke adjustment range 52. A configuration is adopted in which the degree of separation between the pole and the internal gear 22a (the interval in the radial direction between the pole and the internal gear 22a) increases due to the rotation of the cam in accordance with the downward movement of the link 38. In other words, the "release stroke" means the rotation amount of the cam correlating to the degree of separation between the pole and the internal gear 22a. In this manner, due to the release stroke increasing as the pin 42 which is pushed up onto the release stroke adjustment range 52 progresses into the release stroke adjustment range 52, it is possible to more stably maintain the unlocked state of the reclining unit 20 even if the cam rocks due to variation in the product, variation in the assembly, or the like.

In the embodiment, the second disc 22 and the holding plate 45 of the reclining unit 20 may be formed integrally.

In the embodiment, the holding plate 45 may be fixed to the back side frame 12 (the seat back 4 side). In this case, the holding plate 45 may be formed integrally with the back side frame 12.

In the embodiment, the folded portion 38b of the link 38 may be omitted.

In the embodiment, the taper 45c of the holding plate 45 may be omitted.

In the embodiment, the holding plate 45 may be fixed to the second disc 22 closer to the inside (the far side from the first disc 21) than the back side frame 12 in the width direction of the seat.

In the embodiment, the engaging hole 38a of the link 38 may be omitted, and the release operation lever 35 may be supported by the tip portion of the link 38 so as to be only capable of rotating. In this case, in the unlock holding region, the release operation lever 35 maintains the orientation (the unlocking operation position) in relation to the seat cushion 3 (the cushion side frame 11) together with the link 38 and the transmission lever 33 regardless of the rotation of the seat back 4.

In the embodiment, the holding plate 45 may be fixed to an appropriate location on the back side frame 12 (the seat back 4 side) other than the second disc 22.

In the embodiment, the first disc 21, the transmission lever 33, the release operation lever 35, the link 38, and the like are disposed on the cushion side frame 11, and the second disc 22, the holding plate 45, and the like are disposed on the back side frame 12; however, the positional relationship of these may be reversed.

Next, the technical concepts which may be ascertained from the embodiments and other examples are appended hereinafter.

A seat reclining device according to an aspect of this disclosure includes a reclining unit that includes a fixing member which is fixed to a seat cushion side and a rotating member which is fixed to the seat cushion side and is supported by the fixing member to rotate freely, and that switches freely between a locked state which restricts rotation of the rotating member in relation to the fixing member and an unlocked state which allows the rotation, a transmission lever which is supported by the fixing member to rotate freely on the same center as the fixing member, a release operation lever which is supported on the seat cushion side to rotate freely between a lock operation position and an unlocking operation position, a link which includes a protruding portion, in which each end portion of the link is supported by one of the transmission lever and the release operation lever to rotate freely, and which switches the reclining unit from the locked state to the unlocked state via the transmission lever in accordance with rotation of the release operation lever from the lock operation position to the unlocking operation position, and a holding plate that includes an unlock holding portion which is joined to the seat back side to rotate integrally, which extends in a circumferential direction centered on an axial line of the rotating member, and which pushes up the protruding portion when the release operation lever is in the unlocking operation position due to a rotational position of the seat back in relation to the seat cushion reaching the unlock holding region.

According to this configuration, when the reclining unit is in the locked state, the release operation lever is caused to rotate from the lock operation position to the unlocking operation position, and thus, the reclining unit switches to the unlocked state via the link and the transmission lever. Accordingly, the rotational position of the seat back in relation to the seat cushion, that is, the inclination angle of the seat back becomes adjustable. At this time, when the rotational position of the seat back in relation to the seat cushion reaches the unlock holding region, the link maintains the orientation in relation to the seat cushion together with the transmission lever regardless of the rotation of the seat back due to the protruding portion being pushed up onto the unlock holding portion. In other words, even if the seat back is caused to stand from the pushed-forward state, as long as the rotational position of the seat back in relation to the seat cushion is in the unlock holding region, the reclining unit maintains the unlocked state. In this manner, it is possible to maintain the unlocked state of the reclining unit through the setting of the unlock holding region by the holding plate without relying on the specifications of the reclining unit, and it becomes possible to improve the design freedom.

In the seat reclining device, it is preferable that the holding plate is directly fixed to the rotating member.

According to this configuration, due to the holding plate being compactly disposed on the rotating member (the reclining unit), it is possible to achieve a more compact overall device.

In the seat reclining device, it is preferable that end portions of the release operation lever and the link are supported, to rotate freely, by an engaging protruding portion which is provided to protrude from the release operation lever, and an engaging recessed portion into which the engaging protruding portion which is formed on the link is inserted, and which allows movement of the engaging protruding portion to allow rotation of the release operation lever to the lock operation position when the engaging protruding portion is pressed such that the reclining unit switches to the unlocked state via the link and the transmission lever in accordance with rotation of the release operation lever to the unlocking operation position, and the reclining unit is in the unlocked state together with the link and the transmission lever.

According to this configuration, for example, even if the rotational position of the seat back in relation to the seat cushion is in the unlock holding region, the release operation lever is capable of rotating to the lock operation position while causing the engaging protruding portion to move within the engaging recessed portion. Therefore, for example, even if the release operation lever is influenced by an external force to rotate from the unlocking operation position to the lock operation position, the reclining unit is suppressed from following the rotation to switch to the locked state.

In the seat reclining device, it is preferable that the fixing member and the rotating member are fixed to a cushion side frame which is on the seat cushion side and a back side frame which is on the seat back side, respectively, and that the holding plate is fixed to the rotating member at a side which is closer to the fixing member than the back side frame in a width direction of a seat.

According to this configuration, due to the holding plate being disposed closer to the fixing member than the back side frame, it is possible to achieve a more compact overall device.

In the seat reclining device, it is preferable that the holding plate includes a release stroke adjustment range in which a release stroke of the reclining unit gradually increases as the protruding portion which is pushed onto the unlock holding portion progresses onto the unlock holding portion.

According to this configuration, it is possible to more stably maintain the unlocked state of the reclining unit due to the release stroke gradually increasing as the protruding portion which is pushed onto the unlock holding portion progresses onto the unlock holding portion according to the release stroke adjustment range.

In the seat reclining device, it is preferable that a taper which relatively displaces the unlock holding portion to a side approaching the cushion side frame in the width direction of the seat is formed on the holding plate.

According to this configuration, it is possible to suppress the protrusion length of the protruding portion which is necessary for the pushing up of the protruding portion onto the unlock holding portion.

In the seat reclining device, it is preferable that the link includes a folded portion which relatively displaces the protruding portion to a side approaching the cushion side frame in the width direction of the seat.

According to this configuration, it is possible to suppress the protrusion length of the protruding portion which is necessary for the pushing up of the protruding portion onto the unlock holding portion.

The aspect of this disclosure has an effect of being capable of further improving design freedom.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device comprising:
   a reclining unit that includes a fixing member which is fixed to a seat cushion side and a rotating member which is fixed to the seat cushion side and is supported by the fixing member to rotate freely, and that switches freely between a locked state which restricts rotation of the rotating member in relation to the fixing member and an unlocked state which allows the rotation;
   a transmission lever which is supported by the fixing member to rotate freely on a same center as the fixing member;
   a release operation lever which is supported on the seat cushion side to rotate freely between a lock operation position and an unlocking operation position;
   a link which includes a protruding portion, in which each end portion of the link is supported by one of the transmission lever and the release operation lever to rotate freely, and which switches the reclining unit from the locked state to the unlocked state via the transmission lever in accordance with rotation of the release operation lever from the lock operation position to the unlocking operation position; and
   a holding plate that includes an unlock holding portion which is joined to a seat back side to rotate integrally therewith, the unlock holding portion extends in a circumferential direction centered on an axial line of the rotating member, and the unlock holding portion includes a circumferential rim that has a surface extending in a radial direction,
   wherein the circumferential rim slides relative to the protruding portion when the release operation lever is in the unlocking operation position due to a rotational position of a seat back in relation to the seat cushion reaching an unlock holding region.

2. The seat reclining device according to claim 1,
   wherein the holding plate is directly fixed to the rotating member.

3. The seat reclining device according to claim 1,
   wherein end portions of the release operation lever and the link are supported to rotate freely by
   an engaging protruding portion which is provided to protrude from the release operation lever, and
   an engaging recessed portion into which the engaging protruding portion which is formed on the link is inserted, and which allows movement of the engaging protruding portion to allow rotation of the release operation lever to the lock operation position when the engaging protruding portion is pressed such that the reclining unit switches to the unlocked state via the link and the transmission lever in accordance with rotation of the release operation lever to the unlocking operation position, and the reclining unit is in the unlocked state together with the link and the transmission lever.

4. The seat reclining device according to claim 1,
   wherein the fixing member and the rotating member are fixed to a cushion side frame which is on the seat cushion side and a back side frame which is on the seat back side, respectively, and
   wherein the holding plate is fixed to the rotating member at a side which is closer to the fixing member than the back side frame in a width direction of a seat.

5. The seat reclining device according to claim 4,
   wherein the unlock holding portion is displaced in a direction of the cushion side frame in the width direction of the seat.

6. The seat reclining device according to claim 4,
   wherein the link includes a folded portion which displaces the protruding portion in a direction of the cushion side frame in the width direction of the seat.

7. The seat reclining device according to claim 1,
   wherein the holding plate includes a release stroke adjustment range in which a release stroke of the reclining unit gradually increases as the protruding portion is progressively pushed onto the unlock holding portion.

* * * * *